US012439135B2

(12) United States Patent
Gant (10) Patent No.: US 12,439,135 B2
(45) Date of Patent: Oct. 7, 2025

(54) CAMERA ADAPTOR

(71) Applicant: Action-CS, Everett, WA (US)

(72) Inventor: Justin Gant, Lynnwood, WA (US)

(73) Assignee: Action-CS, Everett, WA (US)

( * ) Notice: Subject to any disclaimer, the term of this patent is extended or adjusted under 35 U.S.C. 154(b) by 0 days.

(21) Appl. No.: 17/571,851

(22) Filed: Jan. 10, 2022

(65) Prior Publication Data

US 2022/0224805 A1 Jul. 14, 2022

Related U.S. Application Data

(60) Provisional application No. 63/136,084, filed on Jan. 11, 2021.

(51) Int. Cl.
| | |
|---|---|
| *H04N 23/51* | (2023.01) |
| *H04N 23/57* | (2023.01) |
| *H04N 23/65* | (2023.01) |
| *H04N 23/661* | (2023.01) |

(52) U.S. Cl.
CPC ............ *H04N 23/51* (2023.01); *H04N 23/57* (2023.01); *H04N 23/65* (2023.01); *H04N 23/661* (2023.01)

(58) Field of Classification Search
CPC ....... H04N 23/51; H04N 23/65; H04N 23/661
USPC .................................................... 348/211.99
See application file for complete search history.

(56) References Cited

U.S. PATENT DOCUMENTS

| | | | | |
|---|---|---|---|---|
| 8,208,033 | B2* | 6/2012 | Lundberg | H04N 23/65 |
| | | | | 375/216 |
| 9,769,368 | B1* | 9/2017 | Morford | H04N 23/617 |
| 9,826,128 | B1* | 11/2017 | Ballard | G08B 13/19632 |
| 2015/0264322 | A1* | 9/2015 | Ang | H04N 23/632 |
| | | | | 348/143 |
| 2016/0088211 | A1* | 3/2016 | Chen | H04N 5/23206 |
| | | | | 348/211.3 |
| 2019/0028617 | A1* | 1/2019 | Odom | G03B 17/08 |
| 2021/0075899 | A1* | 3/2021 | Reid | H04M 1/185 |
| 2021/0266428 | A1* | 8/2021 | Dintner | H04N 5/2252 |
| 2021/0385359 | A1* | 12/2021 | Reid | G08B 25/10 |
| 2021/0392006 | A1* | 12/2021 | Rathinasamy | H04L 12/10 |

OTHER PUBLICATIONS

AT&T literature—https://www.att.com/ecms/dam/att/business/help/pdf/att-bridged-mode-vs-ip-passthrough-nov2012-v3.pdf.*

* cited by examiner

*Primary Examiner* — Anthony J Daniels
(74) *Attorney, Agent, or Firm* — CHRISTENSEN O'CONNOR JOHNSON KINDNESS PLLC (57) ABSTRACT

Disclosed is a camera adapter having a case with a first side used for mounting a camera, a second side with a surface mount for mounting the camera adapter to a surface such as a wall or a ceiling and a circuit board mounted within the case. The circuit board includes at least a network interface controller for connecting to a network with a Power over Ethernet (POE) capability, a relay controller for a light, an amplifier, and a microphone bridge. A third side of the case is configured to house the light to be visible to a user. The circuit board can handled all of the video and audio processing of the camera and connect to the surface only via a single CAT5/6 connection for network and power connectivity.

11 Claims, 7 Drawing Sheets

CAMERA ADAPTOR

TECHNICAL FIELD

The present technology pertains to an adaptor for Internet protocol (IP) cameras and more specifically to a new adapter configured on a printed circuit board that provides combined functionality for an IP camera to be mounted on a wall or ceiling without additional components or configuration.

BACKGROUND

Often functionality associated with an IP camera mounted on a wall or ceiling can include a speaker, lights and a microphone. To enable these features in connection with an IP camera, a company will typically need to provide power, obtain the different hardware components such as a microphone and lights, and configure the power and system in a junction box. For example, a company might need to provide a 120 Volt AC power feed to the junction box to power the components, and will likely put together the system manually to include the various hardware components that are desired. The junction box may include a speaker and an LED light and is often configured separate from the IP camera to which it will connect. The various components that might be desired to include in the junction box would have to be soldered together to work. This can lead to a complicated and expensive process, particularly in terms of manual labor time to put the overall system together.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In order to address the issues raised above in terms of how to provide various components such as a microphone, speakers, and lighting associated with an IP camera, the present disclosure introduces a new camera adapter that is configured to enable or provide one or more of a microphone capability, a speaker capability, and/or a lighting capability to any IP camera that is to be mounted. The solution includes a new printed circuit board that includes the necessary components to enable power, speakers, lights, and a microphone to easily be connected to a mounted IP camera. The system could also work for a table-based or portable IP camera as well. Typically, the IP camera will have video outputs and audio inputs and outputs that need to be connected to a system for operation.

Through a Power over Ethernet (POE) protocol, the circuit board of the adapter and the IP camera will be powered. Any IP camera with digital input/output and audio input/output can be attached to the adapter. The camera adapter can be configured as part of a mounting structure that can be mounted on a wall or ceiling. The present disclosure addresses the issues above by providing a new circuit board structure that integrates strobe lights, power via the PoE protocol, a microphone and a speaker.

BRIEF DESCRIPTION OF THE DRAWINGS

In order to describe the manner in which the above-recited issues can be addressed, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Figure 1:
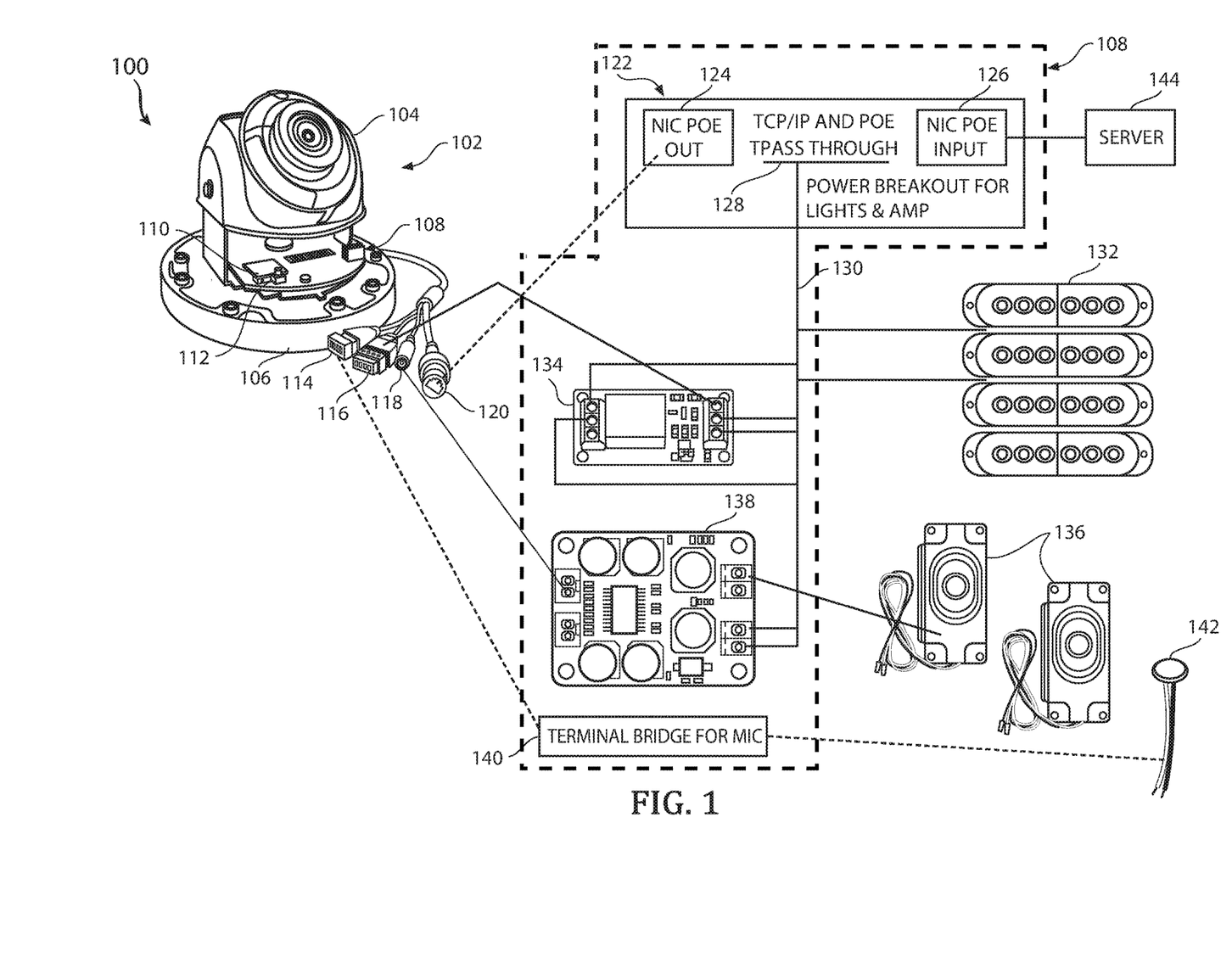
FIG. 1 depicts a not-to-scale schematic view of a simple example of a camera adapter and the various components contained within the camera adapter.

FIG. 1 illustrates an IP camera adapter system 100 according to an aspect of this disclosure. The system 100 includes a camera mount 102, a case (only a portion of the case 106 is shown in FIG. 1, see, e.g., case 302 shown in FIG. 3A), at least one light 132 and at least one speaker 136 that may be mounted within the case, and a circuit board 108 contained within the case. The circuit board 108 includes suitable circuitry for supporting an amplifier 138 for receiving an audio signal from the IP camera and amplifying the audio signal through the speaker(s) 136, a microphone or terminal bridge 140 for receiving audio signals from a microphone 142 and transmitting those audio signals to a camera audio input, and a network interface controller (NIC) 122 for receiving network access and power (via a NIC PoE input 126) using a Power over Ethernet (POE) protocol connection. The amplifier 138 can be a 20 Watt mono or stereo amplifier, for example. The microphone 142 can be a separate microphone from the camera 104 or may be configured as part of the camera 104 structure that is mounted on the camera adapter 102.

An aspect of this disclosure is a new circuit board 108 that includes suitable circuitry for integrating these various components that previously were only available separately. As noted above, the circuit board 108 includes suitable circuitry for supporting the various system components. The suitable circuitry includes the NIC 122, which can be configured on the circuit board 108. The NIC 122 can be configured to break out the power received from the PoE connection (i.e., at the NIC PoE input 126) to power the light 132 and the amplifier 138 as well as powering an IP camera 104 connected to the camera mount 102.

In the exemplary embodiment, the IP camera adapter system 100 does not contain any other power connection other than the PoE connection (i.e., the NIC PoE input 126). A bus 128/130 can cause power and network access (such as via the TCP/IP protocol) to flow from the NIC PoE input 126 to a network interface controller (NIC) PoE output 124 (to power the IP camera 104) and to the other components of the IP camera adapter system 100, such as the light 132, the amplifier 138, and the microphone or terminal bridge 140 (such as including a microphone input and ground component 220 shown in FIG. 2) for the microphone 142. The circuit board 108 can be configured to pass the PoE power through from a network server 144 received at the NIC PoE input 126 to the NIC PoE output 124 to power the IP camera 104.

Features 110, 112 represent electrical components on the circuit board 108, which electrical components can include any components disclosed herein. In one aspect, the system disclosed herein enables the circuit board 108 with its various components to be mounted between the IP camera 104 and the other structures, such as a case, that can be used to mount the system to a wall or ceiling. The IP camera adapter system 100 integrates the lights, speakers and microphone functionality into a single camera adapter 102 rather than requiring people to source individually the various components.

The disclosed circuit board 108 will enable the IP camera adapter system 100 to connect to an Ethernet connection that has Power over Ethernet (POE). For example, IEEE 802.3af-2003 is an industry standard that provides up to 15.4 W of DC power to each port. IEEE 802.3at-2009 is an updated or "plus" standard that provides up to 25.5 W of power for Type 2 devices. In one example, where PoE plus is used, the bus 128/130 of the NIC 122 may break off say 10-12 W of power for the circuit board 108 to power the lights 132 and the amplifier 138. As noted above, the bus 128/130 can cause power and network access (such as via the TCP/IP protocol) to flow from the NIC PoE input 126 to a network interface controller (NIC) PoE output 124 (to power the IP camera 104) and to the other components of the IP camera adapter system 100.

The IEEE 802.3bu-2016 amendment introduced single-pair Power over Data Lines (PoDL) for the single-pair Ethernet standards 100BASE-T1 and 1000BASE-T1 intended for automotive and industrial applications. On the two-pair or four-pair standards, power is transmitted only between pairs, so that within each pair there is no voltage present other than that representing the transmitted data. With single-pair Ethernet, power is transmitted in parallel to the data. PoDL defines 10 power classes, ranging from 0.5 to 50 W (at PD).

IEEE 802.3bt 4PPoE was introduced in September 2018. This standard introduces two additional power types: up to 51 W delivered power (Type 3) and up to 71.3 W delivered power (Type 4). Each pair of twisted pairs needs to handle a current of up to 600 mA (Type 3) or 960 mA (Type 4).

Additionally, support for 2.5GBASE-T, 5GBASE-T and 10GBASE-T is included. The present disclosure can incorporate any of these PoE standards or future developed standards as well. The preferred standard for this disclosure is the IEEE 802.3at-2009, the PoE "plus" version.

Once connected to the IP camera adapter system 100, the camera 104 can communicate with the network server 144 via the Ethernet connection (e.g., via the NIC). A wireless connection can also be used between the camera adapter 102 and the network server 144. Thus, WiFi, cellular or any other type of wireless protocol could also be incorporated into the circuit board 108 for providing wireless connectivity.

The IP camera 104 can generate a digital output signal that provides a high or low signal and it can receive a digital input signal that provides a high or low voltage. The IP camera 104 can also include an audio output through terminal strip or a 3.5 mm jack and a microphone input. DC power plugs (such as plug 118) and CAT5 PoE connections (such as connector 120) are also often provided with the camera 104. The disclosed IP camera adapter system 100 is an accessory to an IP camera that can enable a simple and easy mounting and use of the IP camera for wall or ceiling mount scenarios.

Figure 2:
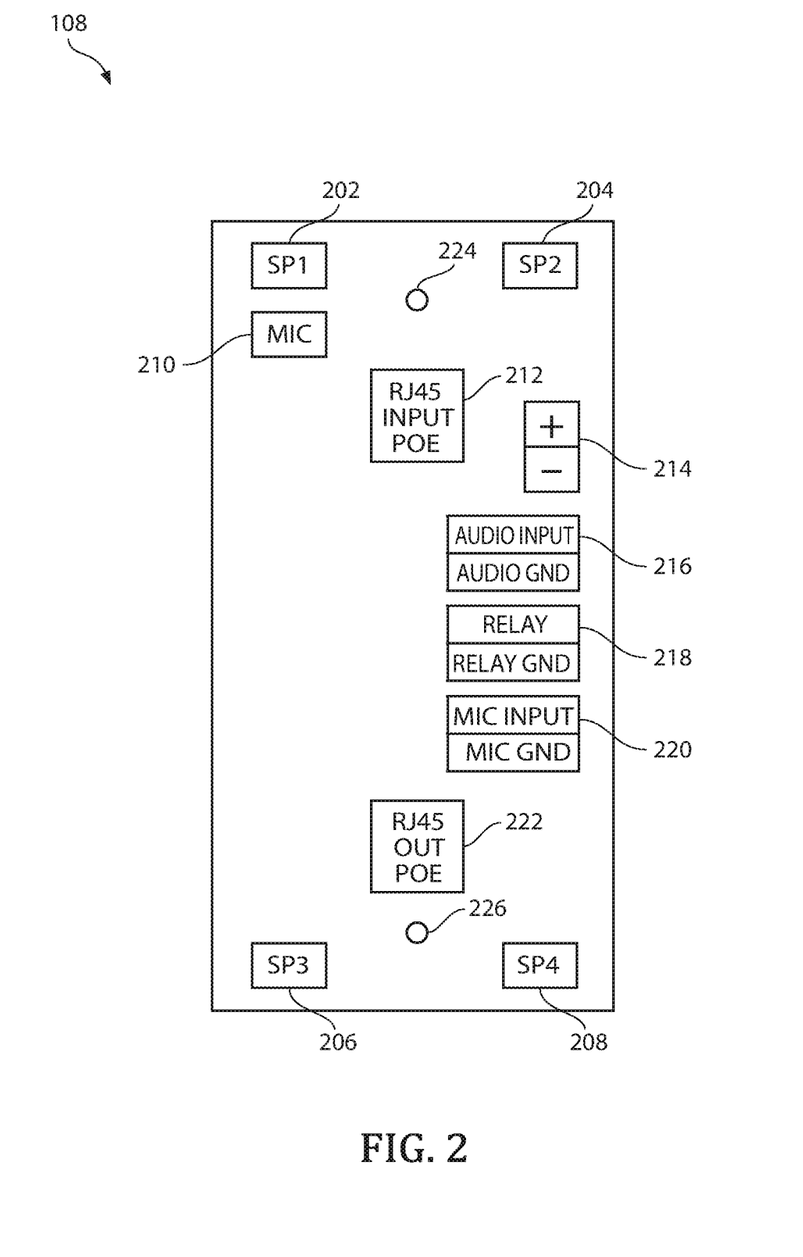
FIG. 2 depicts the general block diagram of a circuit board of the camera adapter.

FIG. 2 illustrates an example block diagram 200 of the circuit board 108 and can include a microphone input and microphone ground component 220, a microphone bridge 210 (similar to bridge 140) for passing input signals from a microphone (such as microphone 142 of the IP camera adapter system 100), an input relay module 214 for receiving input from the IP camera 104 and a relay control including a relay and relay ground component 218 for activating to the light(s) 132, an audio input component 216 (having an audio grounding component) for transmitting audio signals to the amplifier 138, and one or more speaker connections 202, 204, 206, 208 for connecting the amplifier 138 to a speaker 136. Each relay component 214/218 can receive a digital or analog signal (e.g., a digital signal from the IP camera 104) that can trip the relay to perform the associated function such as turning on the light 132 or some other function. The circuit board 108 further includes an RJ45 input PoE connection 212 (such as for the NIC PoE input 126 shown in FIG. 1) and an RJ45 PoE output 222 (such as for the NIC PoE output 124 shown in FIG. 1). An RJ45 input is a "registered jack" (RJ) that is used as a common interface for Internet connectivity. Other interfaces may be used as well and the RJ45 input is provided as an example. The speaker connections 202, 204, 206, 208 can be JST (Japan Solderless Terminal) connections known to those of skill in the art. The microphone connection 210 can also include a JST connection. Mounting holes 224, 226 are shown by way for example for mounting the circuit board 200 in the camera adapter 102.

As can be appreciated, the NIC 122 is configured to power the circuit board 108, thereby providing power to the relay control 218 for controlling the light(s) 132 and the amplifier 138 for amplifying signals transmitted to the speaker(s) 136. At the same time, the circuit board 108 receives TCP/IP data at the NIC PoE input 126 and passes the data through to the PoE output 124 to the IP camera 104.

Figure 3A:
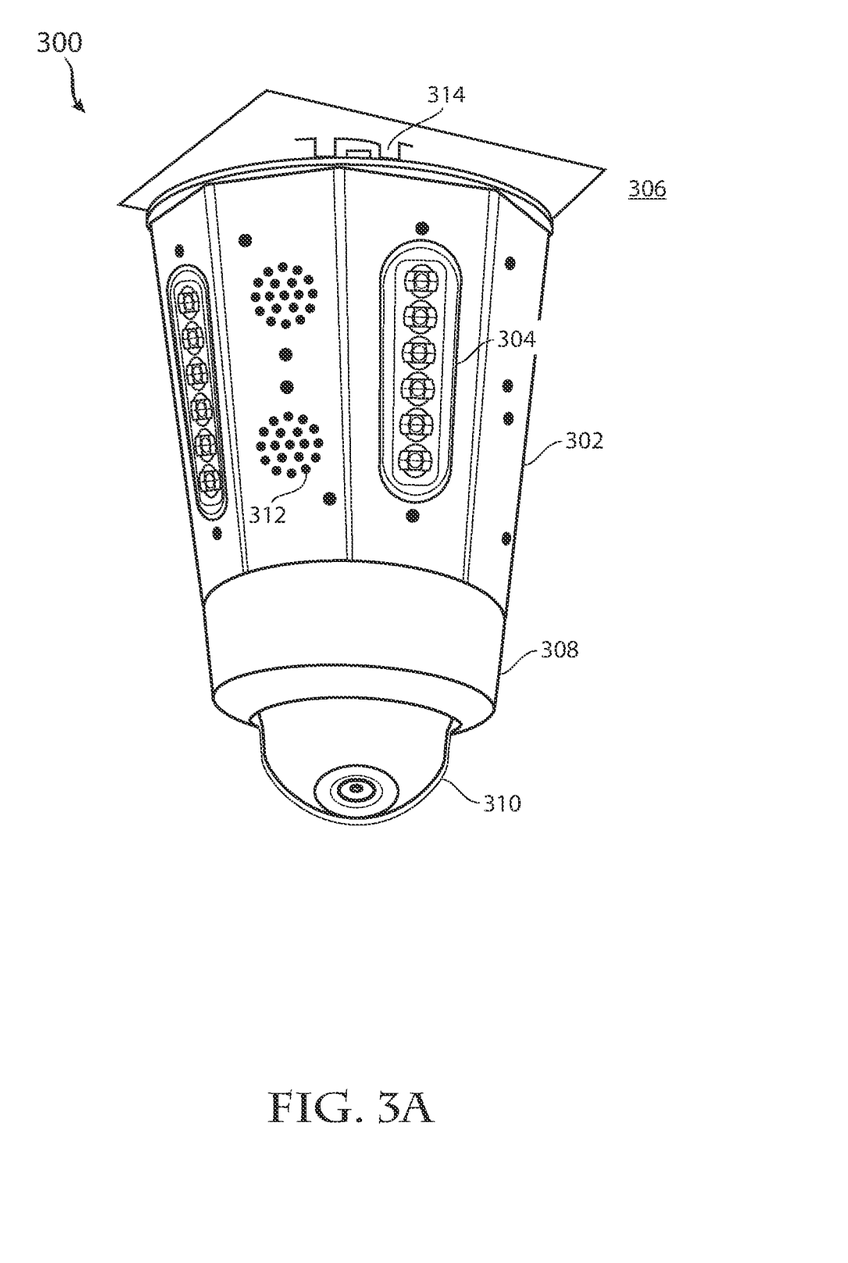
FIG. 3A illustrates the camera adapter mounted to a ceiling.

FIG. 3A illustrates a ceiling mount camera adapter 300. The ceiling mount camera adapter 300 can include a case 302, openings 312 for a microphone or a speaker component (not shown, but configured inside the case 302) and an opening for a light 304 or lights. The case can be made from aluminum, plastic or some other material. A securing component 314 can be used to secure the ceiling mount camera adapter 300 to a ceiling 306. Note that the general shape of the case 302 in this example is cylindrical generally but with various flat sides and with a tapering of the shape from a broad base at the ceiling 306 to a smaller diameter nearer the mounted camera 310. A secondary case 308 can be provided around some of the components of the IP camera adapter system 100 (not shown, but illustrated in FIG. 1 as component 106). This overall structure can be used to simplify the application of cameras in areas such as homes or businesses. By combining the various components onto a single circuit board, and by utilizing the PoE capability of the system, only a PoE network connection needs to be provided to the ceiling mount camera adapter 300 for both power and connectivity. In this respect, the new system simplifies the process and a user only needs to obtain an IP camera that will match the mounting configuration of the ceiling mount camera adapter 300.

Figure 3B:
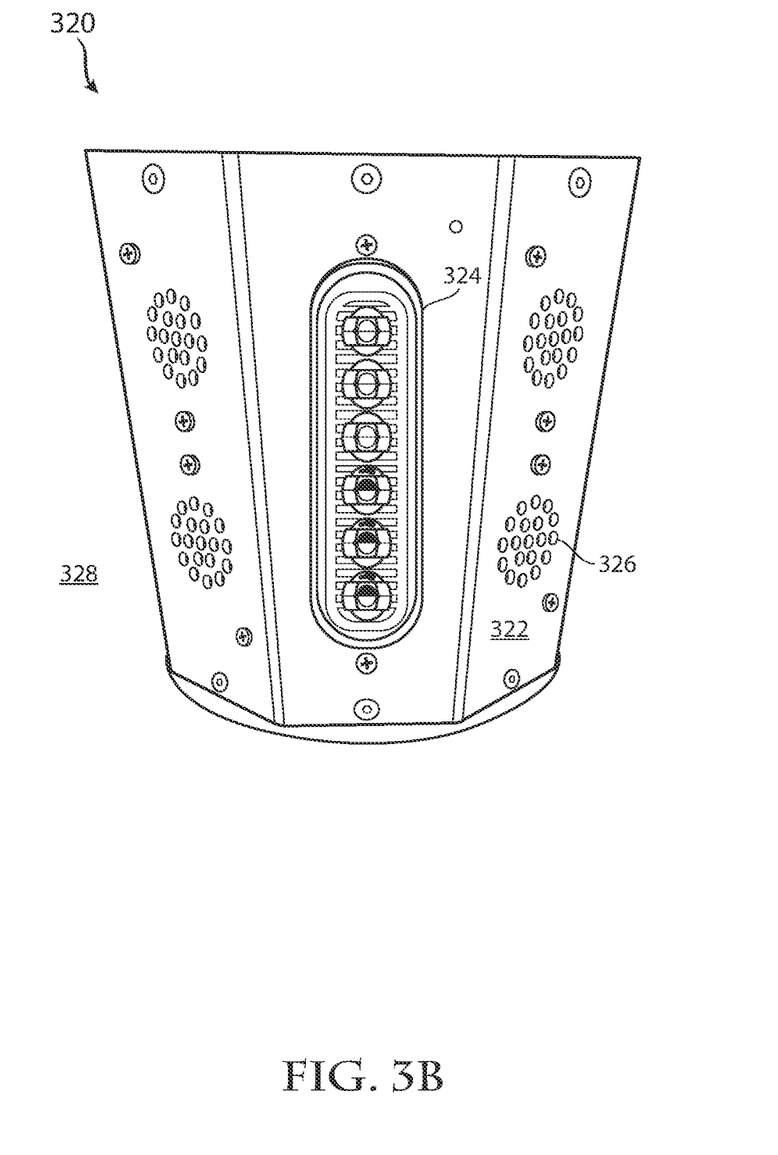
FIG. 3B illustrates the camera adapter mounted to a wall.

FIG. 3B illustrates a wall mount camera adapter 320 configured to mount on a wall 328. In this example, the case 322 is shaped in a similar manner to the ceiling mount camera adapter 300 of FIG. 3A except that a side of the case 322 is flat to be complementary to a wall shape. Openings 326 are shown for a microphone or speaker capability and the lights 324 are shown as well. Not shown in FIG. 3B is a case component similar to case 308 in FIG. 3A. A similar mounting structure can be provided at the bottom surface of the case 322 of FIG. 3B for mounting a camera. The light 132 further can include at least one blue light and at least one red light. The light 304, 324 can be configured in an opening in the case 302/322. In one aspect, the light 304, 324 can include an integrated rope light or a light pipe and can be configured in any position or location on the case 302/322.

As can be appreciated from the foregoing, a wall connection or a ceiling connection to which the system mounts only needs to support a PoE connection to provide network/power capability to the camera adapter 102 and no other power connection. This can simplify the hardware or connectivity needed to enable the use of an IP camera 104 at a location.

Figure 3C:
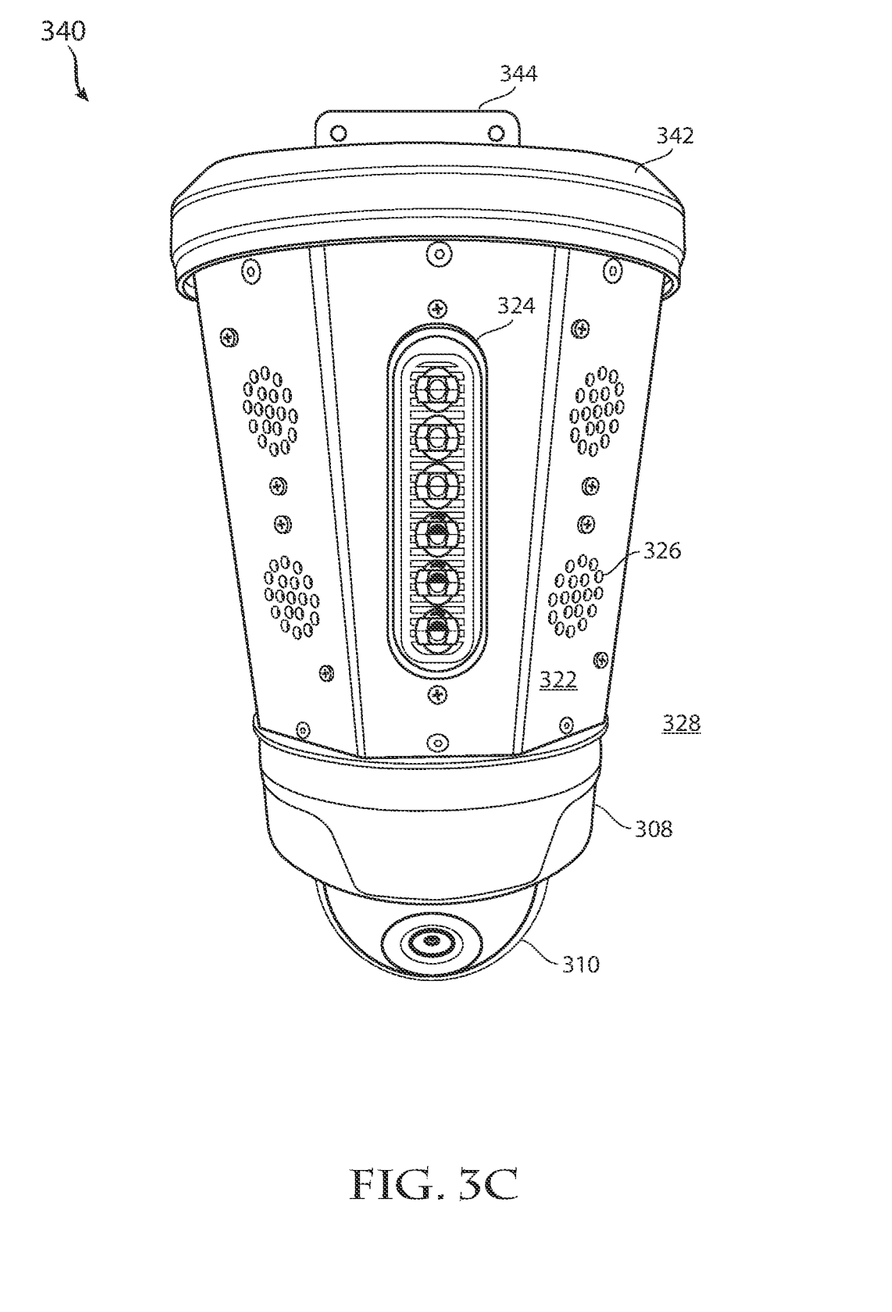
FIG. 3C illustrates a camera adapter having a camera attached.

FIG. 3C illustrates another example of a wall mount camera adapter 340 with an attachment flange 344, a cover 342, a case 322 with openings 326 and lights 324. A camera case 308 is shown in connection with a camera 310. In one example, the circuit board 108 is configured within the case 308 with connectors 114, 116, 118, 120 used for connecting to the camera 104 or various other components such as the light 132, the speaker 136 and the microphone 142.

In one example, a camera adapter 310/320 can include a case 302/322. A first side of the case can have a camera mount for receiving a camera and a second side of the case can have a surface mount 314/344 for mounting the camera adapter to a surface. The surface can be a wall or a ceiling or some other surface as well. The surface does not have to be flat but can be any shape. Generally, the surface will be complementary a configuration of the second side of the case. The camera adapter 310/320 can further include a circuit board 108 mounted within the case 302/322. The circuit board 108 can include at least a network interface controller 122 for connecting to a network server 144 having PoE capability, a relay control for a light 132, an amplifier 138, and a microphone bridge 140. A third side of the case 302/322 can be configured to contain the light 132 to be visible to a user.

Figure 4:
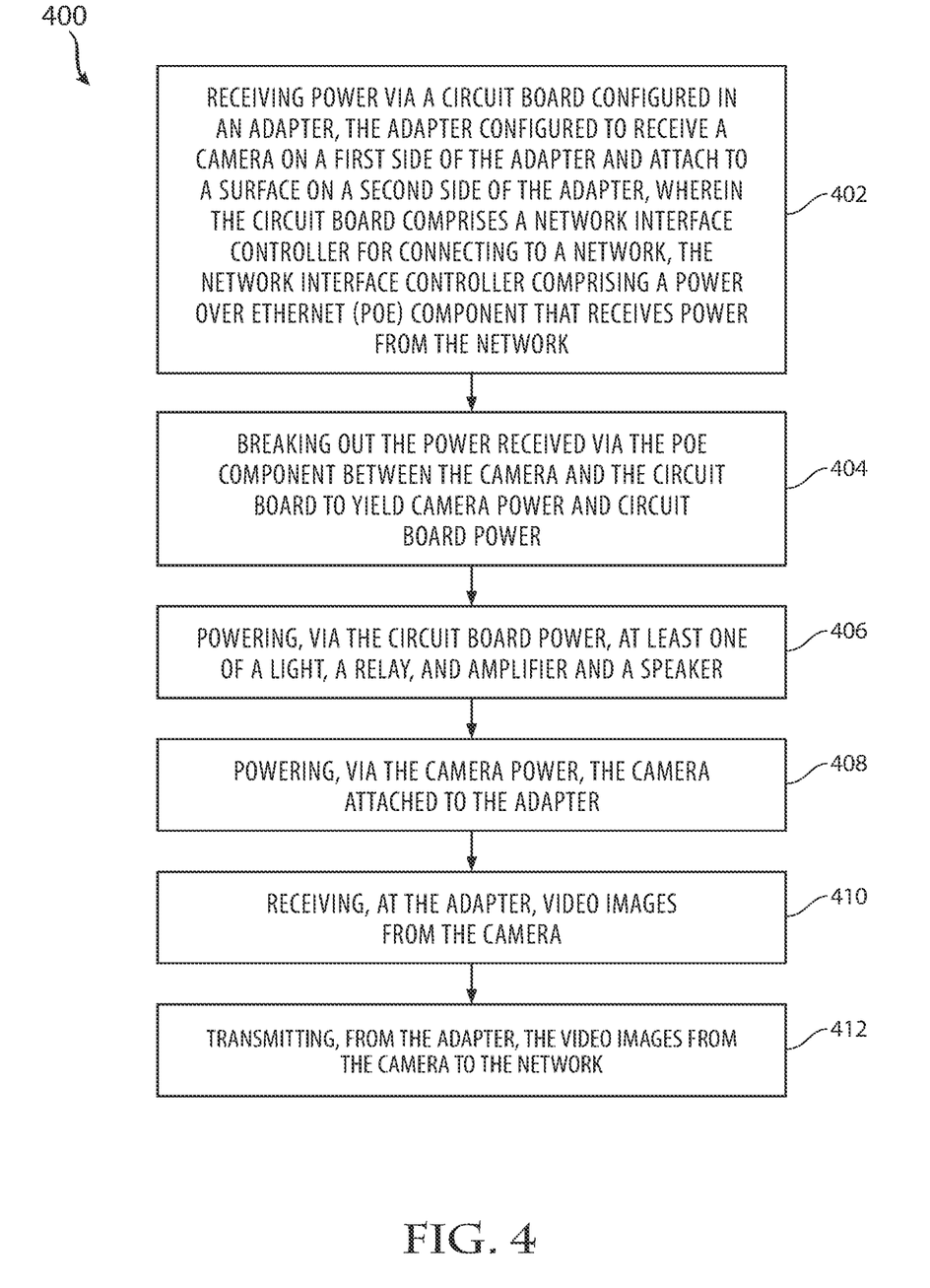
FIG. 4 illustrates an example method according to an aspect of the present disclosure.

FIG. 4 illustrates a method aspect of this disclosure. An example method can include receiving power via a circuit board configured in an adapter, such as the IP camera adapter system 100, the adapter configured to receive a camera on a first side of the adapter and attach to a surface on a second side of the adapter, wherein the circuit board comprises a network interface controller (such as NIC 122) for connecting to a network, the network interface controller comprising a Power over Ethernet (POE) component that receives power from the network (402) (such as NIC PoE input 126), breaking out the power received via the PoE component between the camera and the circuit board to yield camera power and circuit board power (404) (such as through bus 128/130) and powering, via the circuit board power, at least one of a light, a relay, and amplifier and a speaker (406).

The method can further include powering, via the camera power, the camera attached to the adapter (408) (such as through the NIC PoE input 126, bus 128/130, and NIC PoE output 124), receiving, at the adapter, video images from the camera (410) (such as through the NIC PoE output 124) and transmitting, from the adapter, the video images from the camera to the network (412) (such as through the NIC PoE input 126). The surface can include a wall or a ceiling. Other non-flat surfaces can be used as well. In one aspect, the second side of the adapter can be configured to receive power for the camera and circuit board only from the PoE component (such as through the NIC PoE input 126, bus 128/130, and NIC PoE output 124). The network interface controller can use a CAT5/6 cable for connecting to the network (such as through the NIC PoE input 126).

The system may also have a completely different shape from what is disclosed in the figures. For example, another system may be shaped more like a donut, or it might be spherical, and can be made from a material other than aluminum to be more translucent with LED light pipe configured with it. No matter what the shape of the case is for the camera adapter, the circuit functionality described above will still be present.

Figure 5:
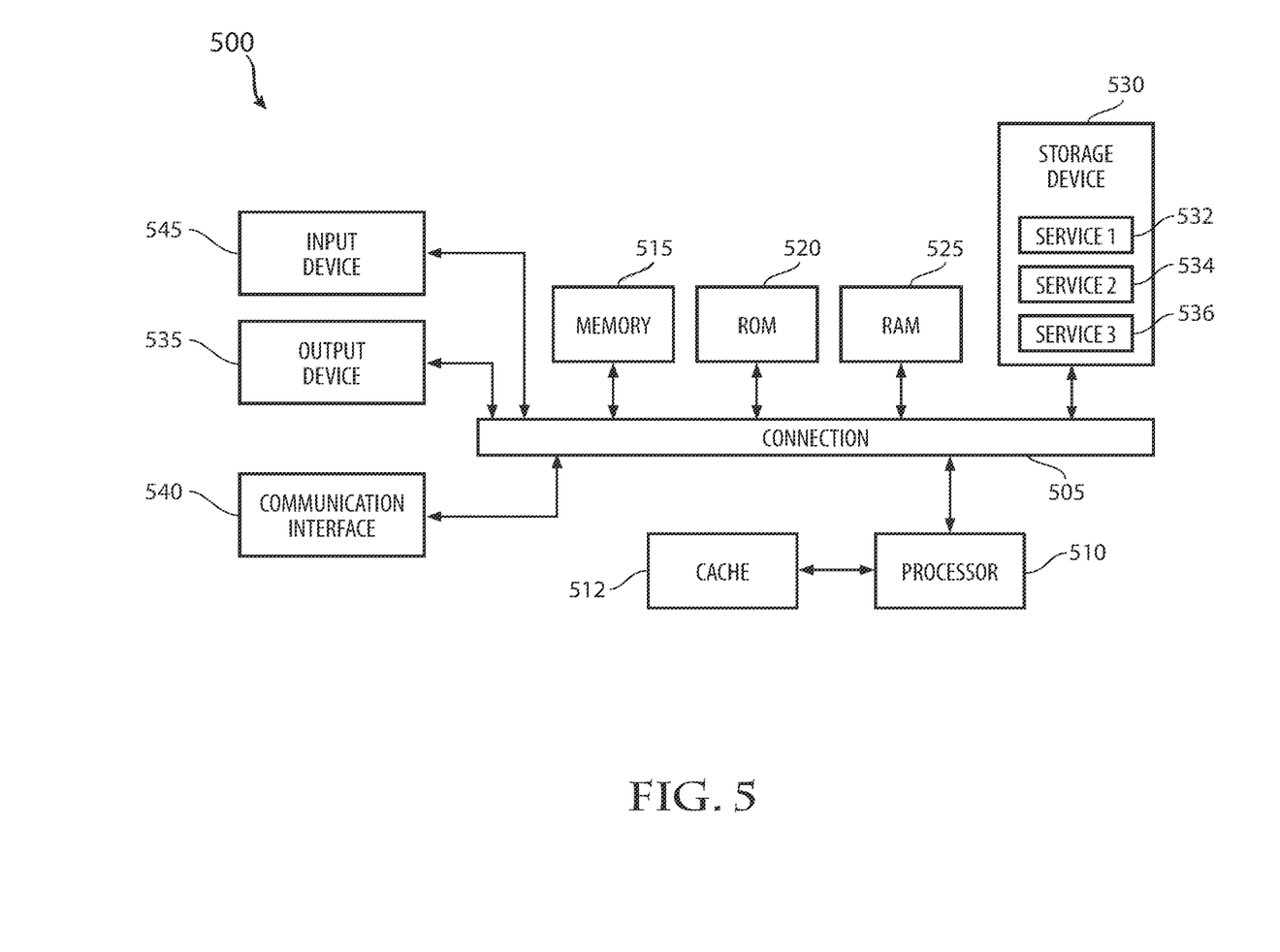
FIG. 5 illustrates a computer system that can be implemented with other aspects of the present disclosure.

FIG. 5 illustrates example computer device that can be used in connection with any of the systems or components disclosed herein. In this example, FIG. 5 illustrates a computing system 500 including components in electrical communication with each other using a connection 505, such as a bus. System 500 includes a processing unit (CPU or processor) 510 and a system connection 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1-532, service 2-534, and service 3-536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

Methods according to the above-described examples can be implemented using computer-executable instructions that are stored or otherwise available from computer readable media. Such instructions can include, for example, instructions and data that cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include satellite components, gateways, user terminals, laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. An adapter for an Internet protocol (IP) camera having a digital output, an audio output, and an ethernet connection, the adapter comprising:
   a camera mount;
   a case;
   a light;
   a speaker;
   a circuit board contained within the case, the circuit board comprising:
      an amplifier configured for receiving an audio signal and amplifying the audio signal through the speaker;
      a relay control for activating the light in response to a digital signal received from the IP camera; and
      a network interface controller (NIC) for receiving network access and power via a power over Ethernet (POE) protocol connection, the NIC comprising a NIC PoE input and a NIC PoE output; and
   a circuit configured on the circuit board, the circuit configured to pass TCP/IP through to the IP camera, the circuit further configured to break out the power received from the PoE connection via the NIC PoE input between powering the relay control and the amplifier and powering the IP camera connected to the camera mount, the circuit comprising:
      a TCP/IP and POE passthrough bus configured to:
         cause network data to flow to the IP camera;
         cause power to flow from the NIC PoE input to the NIC PoE output to power the ethernet connection of the IP camera; and
         transfer video images from the camera to the network; and
      a power breakout bus configured to cause power to flow from the NIC PoE input to the relay control, the light, the amplifier, and the speaker.

2. The adapter of claim 1, wherein the case is configured to mount on a wall or on a ceiling.

3. The adapter of claim 1, further comprising a microphone bridge for receiving audio signals from a microphone and transmitting those audio signals to an audio input.

4. The adapter of claim 1, wherein the light is configured in an opening in the case.

5. The adapter of claim 1, wherein the PoE protocol connection comprises at least one of an IEEE 802.3af-2003, IEEE 802.3at-2009, IEEE 802.3bu-2016 and/or IEEE 802.3bt protocol.

6. The adapter of claim 1, wherein the NIC PoE input provides exclusive power access for the circuit board.

7. The adapter of claim 1, wherein at least one of the NIC PoE input and the NIC PoE output include an RJ45 connector.

8. A method of adapting an Internet protocol (IP) camera for use with at least one of a speaker and a light, the method comprising:
   securing an IP camera to a camera mount of an adapter having a circuit board, the circuit board comprising:
      an amplifier configured for receiving an audio signal from the IP camera and amplifying the audio signal through a speaker;
      a relay control for activating a light in response to a digital signal received from the IP camera; and
      a network interface controller (NIC) for receiving network access and power via a power over Ethernet (POE) protocol connection, the NIC comprising a NIC PoE input and a NIC PoE output;
   connecting the NIC PoE input of a NIC to a network;
   receiving power via the NIC PoE input;
   breaking out the power received via the NIC PoE input between an ethernet connection of the IP camera and circuitry of the circuit board to yield camera power and circuit board power;
   powering, via the circuit board power, at least one of the light, the relay control, the amplifier and the speaker;
   powering, via the camera power transferred from the NIC PoE output to the ethernet connection of the IP camera, the camera attached to the adapter;
   receiving, at the NIC PoE output, video images from the camera; and
   transmitting, via circuitry of the circuit board from the NIC PoE output to the NIC POE input, the video images from the camera to the network, the circuitry comprising:
      a TCP/IP and POE passthrough bus configured to:
         cause network data to flow to the IP camera;
         cause power to flow from the NIC PoE input to the NIC PoE output to power the ethernet connection of the IP camera; and
         transfer video images from the camera to the network; and
      a power breakout bus configured to cause power to flow from the NIC PoE input to the relay control, the light, the amplifier, and the speaker.

9. The method of claim 8, wherein the circuit board further comprises a microphone bridge, and wherein the method further comprises receiving audio signals from a microphone and transmitting those audio signals to an audio input.

10. The method of claim 8, further comprising providing exclusive power access for the circuit board via the NIC POE input.

11. The method of claim 8, further comprising connecting a CAT5E/6 cable between the NIC POE input and a PoE connection for receiving power from and connecting to the network.

* * * * *